C. N. BALDWIN.
Horse Hay-Fork.
No. 108,551.  Patented Oct. 25, 1870.
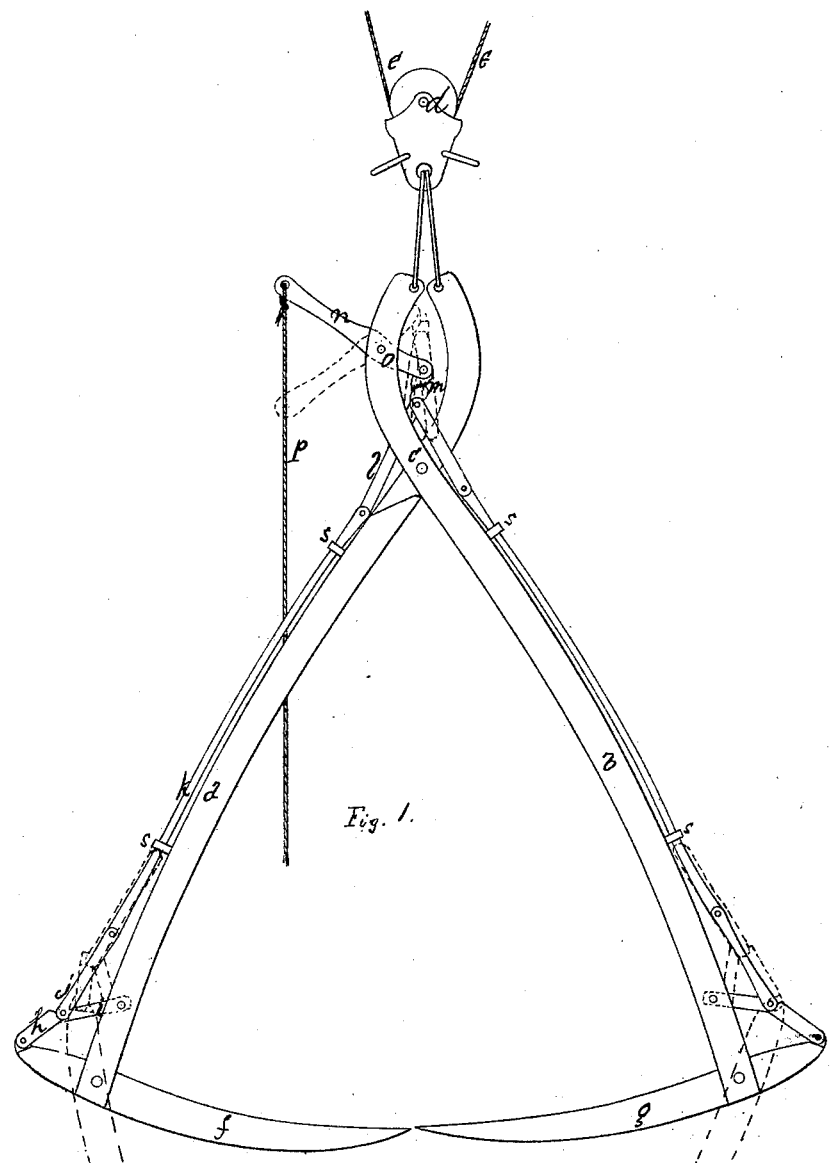

United States Patent Office.

CHARLES N. BALDWIN, OF WILLINGTON, CONNECTICUT.

Letters Patent No. 108,551, dated October 25, 1870.

IMPROVEMENT IN HORSE HAY-FORKS.

The Schedule referred to in these Letters Patent and making part of the same

I, CHARLES N. BALDWIN, of Willington, in the county of Tolland, and State of Connecticut, have invented certain Improvements in Horse Hay-Forks, of which the following is a specification.

Nature and Objects of the Invention.

My invention is an improvement in devices for grappling and raising large quantities of hay, and the like, to be worked by horse or other power.

Description of the Accompanying Drawing.

Figure 1 is a side view, the dotted lines indicating the position of the parts when open.

General Description.

The letters $a$ and $b$ indicate two metal bars, jointed or pivoted together at $c$. At their upper ends they are attached to the lifting-pulley $d$, under which passes the suspending-rope $e$. Of course, when the device is lifted by means of this rope, the tendency of the lower ends of the bars $a$ and $b$ is to close together, and the more hay there is being lifted the stronger is this tendency.

To the lower ends of the bars $a$ and $b$ are pivoted the tines $f$ and $g$; they are hung in slots in the ends of the bars.

To the back end of the tine $f$ is jointed the connecting rod $h$, which, in its turn, is jointed to the rocking-bar $i$ and the connecting-rod $j$, which last-mentioned rod is, in its turn, jointed to the long sliding bar $k$.

One end of the rocking bar $i$ is jointed to the bar $a$, within a slot in which the rocking bar works.

At its upper end the long sliding bar $k$ is jointed to the connecting-rod $l$, which, in its turn, is jointed to the short connecting-rod $m$; and the rod $m$ is also jointed to the lever $n$, to the outer end of which lever the rope P is attached.

Precisely the same intermediate mechanism connects the lever $n$ with the tine $g$, so that both tines work together.

When the parts are all in the position heretofore shown and described, the tines $f$ and $g$ will remain in the position shown, firmly locked, but by pulling down on the rope P the parts will be thrown into the position indicated by the dotted lines, and the load disengaged.

To take up a load, the tines $f$ and $g$ being in the first position shown, the bars $a$ and $b$ are pulled apart, and the tines then allowed to grapple into the load.

The sliding bar $k$ and its duplicate are secured to their respective bars $a$ and $b$ by perforated studs $s$ $s$ $s$ $s$.

Claims.

I claim as my invention—

1. The combination of the bar $a$, the pivoted tine $f$, connecting-rod $h$, rocking bar $i$, connecting-rod $j$, sliding bar $k$, connecting-rod $l$, connecting-rod $m$, and lever $n$, the whole constructed, arranged, and operated substantially as and for the purposes set forth.

2. In combination with the bar $a$ and tine $f$, operated by the parts specified in the immediately preceding clause, the bar $b$ and tine $g$, operated by a precisely similar mechanism, the whole constructed, arranged, and operated substantially as and for the purposes set forth.

CHARLES N. BALDWIN.

Witnesses:
IRA JOHNSON,
SETH O. EATON.